Figure 1:
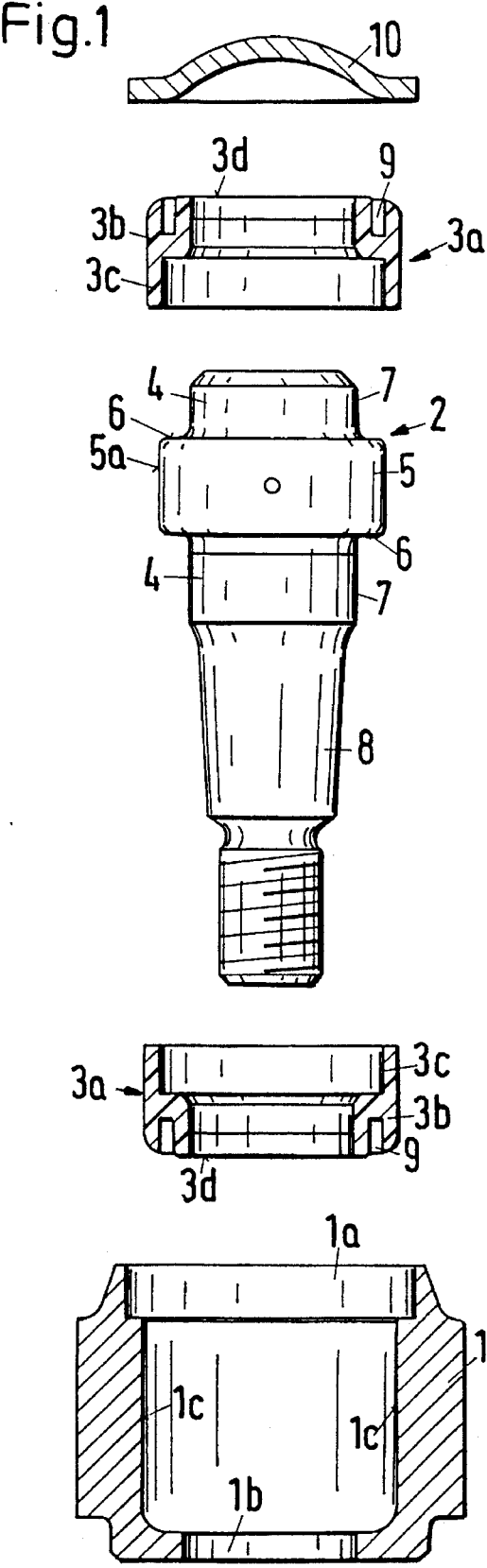

United States Patent

Henkel et al.

Patent Number: 5,529,420
Date of Patent: Jun. 25, 1996

[54] FLANGED PIN JOINT

[75] Inventors: Gunther Henkel, Dusseldorf; Helmut Salm, Neuss, both of Germany

[73] Assignee: TRW Fahrwerksysteme GmbH & Co. KG, Dusseldorf, Germany

[21] Appl. No.: 197,924

[22] Filed: Feb. 17, 1994

[30] Foreign Application Priority Data

Feb. 17, 1993 [DE] Germany .......................... 43 04 775.0

[51] Int. Cl.$^6$ .............................. F16C 11/06; B62D 7/16
[52] U.S. Cl. .......................... 403/135; 403/133; 403/120; 280/716; 280/674
[58] Field of Search .................................. 403/164, 165, 403/152, 154, 133, 120, 135, 132; 280/716, 674

[56] References Cited

U.S. PATENT DOCUMENTS

| | | | |
|---|---|---|---|
| 2,855,232 | 10/1958 | Kozak | 403/132 |
| 3,010,733 | 11/1961 | Melton et al. | 403/164 X |
| 3,130,991 | 4/1964 | Piragino . | |
| 3,909,084 | 9/1975 | Snidar et al. | 403/135 X |
| 5,028,163 | 7/1991 | Krieg et al. | 403/165 X |
| 5,247,848 | 9/1993 | Sabel | 403/135 X |

FOREIGN PATENT DOCUMENTS

| | | |
|---|---|---|
| 3824271 | 3/1990 | Germany . |
| 4104949 | 8/1991 | Germany . |
| 4127092 | 1/1993 | Germany . |
| 811304 | 4/1959 | United Kingdom . |
| 1372974 | 11/1974 | United Kingdom . |
| 1382305 | 1/1975 | United Kingdom . |
| 1510740 | 5/1978 | United Kingdom . |

*Primary Examiner*—Anthony Knight
*Attorney, Agent, or Firm*—Tarolli, Sundheim, Covell, Tummino & Szabo

[57] ABSTRACT

The invention pertains to a flanged pin joint with a housing (1) in which a flanged pin (2) is arranged such that it may be rotated as well as tilted to a limited extent, in which the flanged pin is supported via bearing bushes (3a) on the cylindrical bearing surface (1c) of the housing (1) with the cylindrical outer surface (5a) of the flange (5) as well as the cylindrical surfaces (7) of the pin (4) which adjoin the flange on both sides via annular surfaces (6), in which the housing (1) is closed by a cover (10) which causes an axial prestress of the bearing bushes (3a). In order to attain an accurately pre-adjustable resetting force and/or tilting elasticity of the flanged pin joint while simultaneously reducing the manufacturing cost, two bearing bushes (3a) are provided which each have a ring part (3c) which covers half the axial extent of the flange (5) as well as a base part (3b) that becomes thicker towards the inside and fills out the space between the respective cylindrical surface (7) of the pin (4) and the housing (1) or the cover (10).

2 Claims, 2 Drawing Sheets

FLANGED PIN JOINT

The invention pertains to a flanged pin joint with a housing in which a flanged pin is arranged such that it may be rotated as well as tilted to a limited extent, whereby said flanged pin is supported via bearing bushes on the cylindrical bearing surface of the housing with the cylindrical outer surface of the flange as well as the cylindrical surfaces of the pin which adjoin the flange of both sides via annular surfaces, and whereby the housing is closed by a cover which causes an axial prestress of the bearing bushes.

Flanged pin joints of this type are known from practical applications. These known flanged pin joints have the disadvantage that the bearing shells consist of three parts, and that a defined resetting of the joint can only be attained by observing very strict manufacturing tolerances. The resetting force of these known flanged pin joints is thus very dependent on the tolerances to be observed as well as the wear of the bearing shell material.

The invention is based on the objective to introduce a flanged pin joint of the initially described type in which a preadjustable resetting force which is essentially not dependent on the wear is insured while simultaneously reducing the manufacturing costs due to the fact that the highly accurate tolerances no longer have to be observed.

According to the invention, the solution which attains this objective is characterized by two bearing bushes which are each provided with a ring part which covers half of the axial length of the flange as well as a base part which becomes thicker towards the inside and fills the space between the respective cylindrical surface of the pin and the housing or the lid.

In the flanged pin joint according to the invention, the bearing shell only consists of two bearing bushes. The axial distortion of the joint and thus also the resetting force of the joint is attained by corresponding dimensioning of the two bearing bushes which are constructed identically. It is, for example, possible to construct the axially extending ring parts of the bearing bushes in such a way that the flanged pin is clamped more intensely inside of the housing within the region of the flange than the adjacent cylindrical surfaces. A flanged pin joint constructed in this fashion only has a very small resetting force. A higher resetting force may be obtained if the distortion of the flanged pin in the housing above the base part of the bearing bushes is increased such that the cylindrical surfaces adjoining the flange absorb the tilting moment which occurs during the excursion of the flanged pin.

According to an additional characteristic of the invention, an annular groove is arranged on the base parts, whereby said annular groove is open towards the face side of the bearing bushes. The elasticity of the bearing bushes and the tilting elasticity of the joint may be adjusted by the shape of the annular groove, which, in other words, means its width and its depth.

According to the preferred embodiment of the invention, the edges of the annular groove are connected with each other by means of crosspieces. These connecting crosspieces cause the edges of the annular groove to mutually brace one another and thus prevent an excessively flexible support. According to a particularly preferred embodiment, the crosspieces extend tangentially such that the tangentially-constructed crosspieces generate an additional resetting force during a rotation or tilting movement of the flanged pin because they take over the function of a spring.

The invention also suggests manufacture of the bearing bushes from polyamide. The utilization of polyamide provides the advantage that the bearing bushes may be manufactured economically as molded parts and that the bearing bushes may withstand temperatures up to 150° C.

Figure 2:
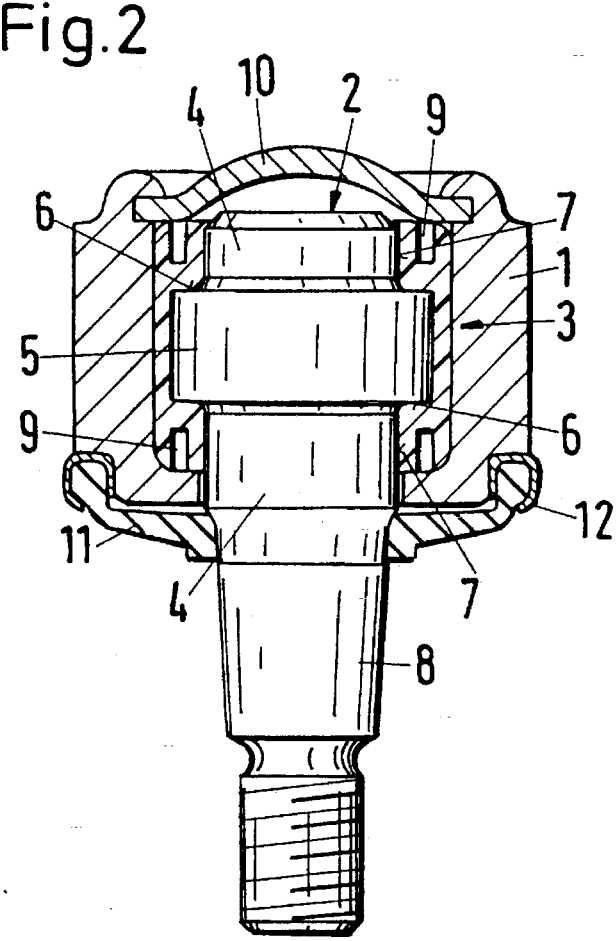
Figure 3:
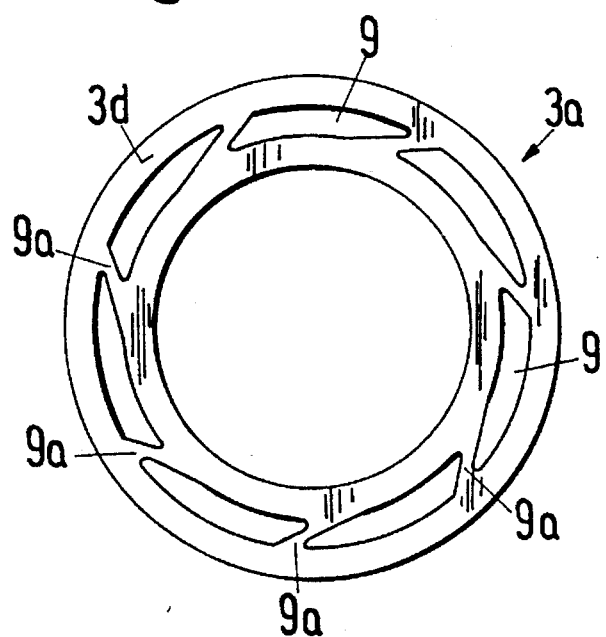

Additional details and advantages of the invention are disclosed in the following description of the respective figures which illustrate a preferred embodiment of the flanged pin joint according to the invention. The figures show:

FIG. 1 an exploded view of the flanged pin joint according to the invention which is partially sectioned in the longitudinal direction, FIG. 2 a partial longitudinal section through an assembled flanged pin joint, and FIG. 3 a top view of the bearing bush.

The flanged pin joint illustrated in FIGS. 1 and 2 essentially consists of a housing 1, inside of which a flanged pin 2 is arranged in a bearing shell 3 such that it may be rotated as well as tilted to a limited extent, whereby the bearing shell 3 consists of two bearing bushes 3a.

The exploded view of the flanged pin joint which is illustrated in FIG. 1 shows the design of the flanged pin joint. The housing 1 has an assembly opening 1a on its upper side as well as a smaller opening 1b on its lower side. The inner side of the housing 1 is constructed as a cylindrical support surface 1c for the bearing bushes 3a of the bearing shell 3.

The flanged pin 2 has a flange 5 which is situated on the pin 4 and has an outer surface 5a, whereby said flange adjoins the cylindrical surfaces 7 of the pin 4. The pin 4 of the flanged pin 2 has a conical pin shaft 8 on one side. The two identically constructed bearing bushes 3a have a base part 3b which becomes thicker towards the inside as well as a radially extending ring part 3c that is situated adjacent to the aforementioned base part. Annular grooves 9 are arranged in the base parts 3b of the bearing bushes 3a, whereby said annular grooves are open towards the face side 3d of the bearing bushes, and the edges of the annular grooves are connected with each other via crosspieces 9a as shown in FIG. 3.

The assembled flanged pin joint illustrated in FIG. 2 shows that the housing 1 is closed on both sides. The assembly opening 1a is closed by means of a cover 10, while the lower opening 1b is closed via a sealing bellows 11, one end of which is fixed onto the housing 1 via a clamping ring 12, and the other end of which firmly adjoins the pin shaft 8 of the flanged pin 2.

When assembling the flanged pin joint, the lower bearing bush 3a is at first inserted into the housing 1 through the assembly opening 1a. The flanged pin 2 is subsequently inserted into housing 1 with the pin shaft 8 pointing forward such that the pin shaft 8 protrudes out of the housing 1 through the lower opening 1b. The flanged pin 2 which was inserted into the housing 1 adjoins the base part 3b of the lower bearing bush 3a with the annular surfaces 6, while the ring part 3c encloses approximately half the height of the outer surface 5a of the flange 5 in the axial direction. In order to complete the bearing shell 3, the second bearing bush 3a is now attached onto the flanged pin 2 such that its ring part 3c encloses the remaining outer surface 5a of the flange 5. The base part 3b of the bearing bush 3a fills out the space between the cylindrical surfaces 7 of the pin 4 and the housing 1 in assembled condition. The assembly is concluded by closing the housing 1 with the cover 10, whereby the edge of the assembly opening 1a in the housing 1 is beaded over the cover 10.

The cover 10 causes a prestress of the bearing bushes 3a because said cover presses against the base part 3c of the upper bearing bush 3a and thus exerts an axial force onto the flanged pin 2 via the annular surfaces 6 as well as the lower bearing bush 3a.

The axial distortion of the joint may be adjusted accurately by dimensioning the bearing bushes 3a correspondingly. If a low torque and a high tilting elasticity is required, the ring parts 3c extending along the outer surface 5a of the flange 5 in the axial direction are constructed somewhat longer than half the height of the outer surface 5a, so that the base part 3b of the upper bearing shell 3a does not directly adjoin the upper annular surface 6 when assembling the flanged pin joint. The base part 3d and the annular surface 6 only come in contact due to the distortion caused by the cover 10, but only a minute axial distortion of the flanged pin joint is attained in this fashion.

However, if a high torque and a low tilting elasticity are required, the ring parts 3c of the bearing bush 3a are constructed somewhat shorter than half the height of the outer surface 5a of the flange 5. In this particular variation, the base part 3b of the upper bearing bush 3a is also in contact with the annular surface 6 in nondistorted condition. The pressure applied onto the flanged pin 2 by the upper bearing bush 3a is increased due to the axial prestress caused by the cover 10 such that the required low tilting elasticity is attained.

In addition, the required tilting elasticity may be attained by constructing the annular grooves 9 in the base parts 3b of the bearing bushes 3a differently. The elasticity of the groove 9 is increased by the crosspieces 9a which connect the edges of the groove with each other because said crosspieces tend to press the edges of the groove apart again. The tangential orientation of the crosspieces 9a which is illustrated in FIG. 3 in particular causes a resetting of the groove edges and thus has an immense influence on the tilting elasticity of the joint since the tangentially arranged crosspieces 9a act like a spring during a rotation and tilting movement of the flanged pin 2 and generate an additional resetting force.

A flanged pin joint constructed in this fashion excels due to the fact that an exactly defined resetting force and tilting elasticity may be adjusted in the flanged pin joint by a targeted construction of the bearing bushes.

| List of reference numerals: | |
| --- | --- |
| 1 | Housing |
| 1a | Assembly opening |
| 1b | Opening |
| 1c | Bearing surface |
| 2 | Flanged pin |
| 3 | Bearing shell |
| 3a | Bearing bush |
| 3b | Base part |
| 3c | Ring part |
| 3d | Face side |
| 4 | Pin |
| 5 | Flange |
| 5a | Outer surface |
| 6 | Annular surface |
| 7 | Surface |
| 8 | Pin shaft |
| 9 | Annular groove |
| 9a | Crosspiece |
| 10 | Cover |
| 11 | Sealing bellow |
| 12 | Clamping ring |

We claim:

1. Flanged pin joint with a housing in which a flanged pin is arranged such that it may be rotated as well as tilted to a limited extent, whereby said flanged pin is supported via bearing bushes on the cylindrical bearing surface of the housing with the cylindrical outer surface of the flange as well as the cylindrical surfaces of the pin which adjoin the flange on both sides via annular surfaces, and whereby the housing is closed by a cover which causes an axial prestress of the bearing bushes, characterized by two bearing bushes (3a) which are each provided with a ring part (3c) which covers half the axial length of the flange (5) and a base part (3b) that becomes thicker towards the inside and fills out the space between each respective cylindrical surface (7) of the pin (4) and the housing (1) or the cover (10);

characterized by the fact that an annular groove (9) is arranged in the base part (3b), whereby said annular groove is open towards the face side (3d) of the base part;

characterized by the fact that the edges of the annular groove (9) are connected with each other via crosspieces (9a); and characterized by the fact that the crosspieces (9a) extend approximately tangentially.

2. Flanged pin joint according to claim 1, characterized in that the bearing bushings (3a) are made of polyamide.

* * * * *